United States Patent
Reddy et al.

(10) Patent No.: US 12,238,446 B2
(45) Date of Patent: Feb. 25, 2025

(54) LOCATION-BASED FRAME SKIPPING

(71) Applicant: MICROSOFT TECHNOLOGY LICENSING, LLC, Redmond, WA (US)

(72) Inventors: Vanshika Shyamala Reddy, Fairfax, VA (US); Nicholas Patrick Skacel, Ashburn, VA (US); Son Bach Nguyen, Broadlands, VA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 38 days.

(21) Appl. No.: 18/087,684

(22) Filed: Dec. 22, 2022

(65) Prior Publication Data

US 2024/0214509 A1 Jun. 27, 2024

(51) Int. Cl.
*H04N 5/262* (2006.01)
*B64C 39/02* (2023.01)
(Continued)

(52) U.S. Cl.
CPC ......... *H04N 5/2624* (2013.01); *B64C 39/024* (2013.01); *B64U 20/87* (2023.01); *G06T 7/70* (2017.01); *H04N 5/915* (2013.01); *B64U 2101/31* (2023.01); *G06T 2207/10016* (2013.01); *G06T 2207/10032* (2013.01)

(58) Field of Classification Search
CPC .... H04N 5/2624; H04N 5/915; B64C 39/024; B64U 20/87; B64U 2101/31; G06T 7/70; G06T 2207/10016; G06T 2207/10032
See application file for complete search history.

(56) References Cited

U.S. PATENT DOCUMENTS

| 5,539,527 | A | * | 7/1996 | Kajimoto | G11B 27/34 360/13 |
| 10,848,737 | B2 | | 11/2020 | Hur et al. | |

(Continued)

FOREIGN PATENT DOCUMENTS

| CN | 101364305 A | * | 2/2009 | ........... H04N 19/103 |
| CN | 110321806 A | * | 10/2019 | ......... G06K 9/00624 |

(Continued)

OTHER PUBLICATIONS

Bang, et al., "UAV-based Automatic Generation of High-resolution Panorama at a Construction Site with A Focus on Preprocessing for Image Stitching", Automation in Construction, vol. 84, Aug. 30, 2017, pp. 70-80.

(Continued)

*Primary Examiner* — Michael Lee
(74) *Attorney, Agent, or Firm* — Newport IP, LLC; Jacob P. Rohwer

(57) ABSTRACT

The techniques described herein implement an automated frame skipping approach used to generate a reduced set of frames for processing. In one example, the automated frame skipping approach is used to more efficiently generate a stitched map of a geographical area being surveilled by an aerial vehicle, such as an unmanned aerial vehicle (UAV). A stitched map is an image mosaic that is created using the reduced set of frames such that the geographical area being surveilled by the aerial vehicle is accurately depicted.

20 Claims, 6 Drawing Sheets

(51) Int. Cl.
*B64U 20/87* (2023.01)
*B64U 101/31* (2023.01)
*G06T 7/70* (2017.01)
*H04N 5/915* (2006.01)

(56) References Cited

U.S. PATENT DOCUMENTS

| | | | |
|---|---|---|---|
| 2013/0094700 A1* | 4/2013 | Mellor | G06T 7/246 |
| | | | 382/103 |
| 2013/0208992 A1* | 8/2013 | Lin | H04N 19/507 |
| | | | 382/236 |
| 2017/0365102 A1 | 12/2017 | Huston et al. | |
| 2018/0348058 A1* | 12/2018 | Munir | G06T 7/70 |
| 2020/0296350 A1 | 9/2020 | Oh | |
| 2021/0200246 A1* | 7/2021 | Deruaz-Pepin | G06V 20/17 |
| 2022/0092341 A1* | 3/2022 | Levin | G06Q 30/0242 |

FOREIGN PATENT DOCUMENTS

| | | | | |
|---|---|---|---|---|
| CN | 111161313 A | * | 5/2020 | G06T 5/002 |
| CN | 113766175 A | * | 12/2021 | |
| CN | 114612926 A | * | 6/2022 | |
| CN | 114777744 A | | 7/2022 | |
| CN | 111881755 B | * | 8/2022 | G06K 9/00228 |
| JP | 2014215751 A | * | 11/2014 | |

OTHER PUBLICATIONS

International Search Report and Written Opinion received for PCT Application No. PCT/US2023/036927, mailed on Mar. 6, 2024, 15 pages.

Zhang, et al., "GPS-assisted Aerial Image Stitching Based on Optimization Algorithm", Proceedings of the 38th Chinese Control Conference (CCC), Jul. 27, 2019, pp. 3485-3490.

\* cited by examiner

LOCATION-BASED FRAME SKIPPING

BACKGROUND

Aerial vehicles, such as unmanned aerial vehicles (UAVs) (commonly referred to as "drones") or airplanes, are often used to surveil a geographical area. More specifically, an aerial vehicle typically includes a camera that captures high quality video at a rate of up to four frames per second. In a situation where an UAV is surveilling a geographical area for fifteen minutes at an altitude of about one hundred feet and is moving at a speed of about fifteen miles per hour in various directions (e.g., north, south, east, west), the video captured by the UAV includes roughly three thousand and six hundred frames that need to be post-processed after the UAV lands. This number of high quality frames can require a large amount of processing and/or storage resources, as well as time, to post-process.

SUMMARY

The disclosed techniques implement an automated frame skipping approach used to generate a reduced set of frames for processing. In one example, the automated frame skipping approach is used to more efficiently generate a stitched map of a geographical area being surveilled by an aerial vehicle such as an unmanned aerial vehicle (UAV). A stitched map is an image mosaic that is created using the reduced set of frames such that the geographical area being surveilled by the UAV is accurately depicted.

A system is configured to generate a sequence of frames from video captured by a camera attached to and/or located on the aerial vehicle. Each frame in the sequence of frames is associated with metadata that indicates a location and/or altitude of the camera and/or the aerial vehicle at a time the frame is captured. To generate the reduced set of frames, the system evaluates the frames in sequence and determines whether frames include overlapping content. In one example, the system performs image analysis to determine whether a change in content between a current frame being evaluated and a previously evaluated frame that has already been added to the reduced set of frames satisfies an overlap threshold (e.g., less than twenty percent of the content of the current frame overlaps with the content of the previously evaluated frame). If the system determines that the change in content between the current frame and the previously evaluated frame does not satisfy the overlap threshold, the system discards the current frame and does not add the current frame to the reduced set of frames. If the system determines that the change in content between the current frame and the previously evaluated frame satisfies the overlap threshold, the system adds the current frame to the reduced set of frames. Furthermore, the system determines a location delta threshold based on the location of the camera and/or the aerial vehicle when the current frame was captured and the location of the camera and/or the aerial vehicle when the previously evaluated frame was captured.

The location delta threshold is used to ensure that a subsequent frame being evaluated includes a sufficient amount of new content when compared to any previously evaluated frame that has been added to the reduced set of frames (e.g., the amount of overlapping content is less than the overlap threshold). Once the location delta threshold is learned, the system no longer has to spend the time and resources to perform image analysis to determine the amount of content overlap. Rather, the system can determine whether the location delta between the location of the camera and/or the aerial vehicle when a current frame being evaluated is captured and the location of the camera and/or the aerial vehicle when any previously evaluated frame that has already been added to the reduced set of frames is captured satisfies the location delta threshold. If the location delta does not satisfy the location delta threshold, the content captured in the current frame is considered to be duplicative. Stated alternatively, the system determines that objects located in a portion of the geographical area that is captured by the current frame can already be seen in a previous frame that has already been added to the reduced set of frames. Therefore, the system is able to discard the current frame to improve the efficiency with which the frames from the video can be processed. In contrast, if the location delta satisfies the location delta threshold, the system determines that the content captured in the current frame is distinct (e.g., includes less than a threshold amount of overlap) and the current frame is added to the reduced set of frames.

In one example, the location of the camera and/or the aerial vehicle is determined via a Global Positioning System (GPS) component. Accordingly, coordinates determined via the GPS component represent the location of the camera and/or the aerial vehicle. The coordinates include a latitude position and a longitude position, each of which can be defined in degrees, minutes, seconds, and/or tenths of seconds.

As described above, the reduced set of frames can be used to efficiently generate an image mosaic of the geographical area being surveilled by the aerial vehicle. Accordingly, the system described herein is able to convert a video into a stitched map of the geographical area being surveilled. In one example, the system is a mobile device that uploads the stitched map to a cloud platform so that users can download and interact with the stitched map. For instance, a head-mounted display device can download the stitched map to enable user interaction with the stitched map in a two-dimensional (2D) format or a three-dimensional (3D) format.

One scenario in which the techniques described herein can be used is when the geographical area being surveilled by an aerial vehicle, such as a UAV, needs to be urgently inspected to identify problems. For instance, a public safety reason may require the immediate manual inspection of the geographical area (e.g., to identify damage to building structures, to determine where people in need of help are located, to identify the current location and available navigation routes of a public threat such as an active shooter or a wild animal). Accordingly, via the use of the aerial vehicle and the frame skipping approach, the stitched map can be generated in a matter of minutes. Moreover, the stitched map can be made available for download via the cloud so that an inspector can view and interact with the stitched map (e.g., zoom in, zoom out) via a head-mounted display device or other type of device.

Consequently, the surveillance provided by the aerial vehicle is configured to provide an up-to-date view into a geographical area for inspection purposes. The frame skipping approach reduces the number of frames that need to be processed, and this in turn reduces the amount of hardware resources (e.g., processing resources, storage resources) required to post-process the video.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein implement an automated frame skipping approach used to generate a reduced set of frames for processing. In one example, the automated frame skipping approach is used to more efficiently generate a stitched map of a geographical area being surveilled by an aerial vehicle such as unmanned aerial vehicle (UAV). A stitched map is an image mosaic that is created using the reduced set of frames such that the geographical area being surveilled by the aerial vehicle is accurately depicted.

Various examples, scenarios, and aspects that enable the techniques described herein are described below with respect to FIGS. 1-6.

Figure 1:
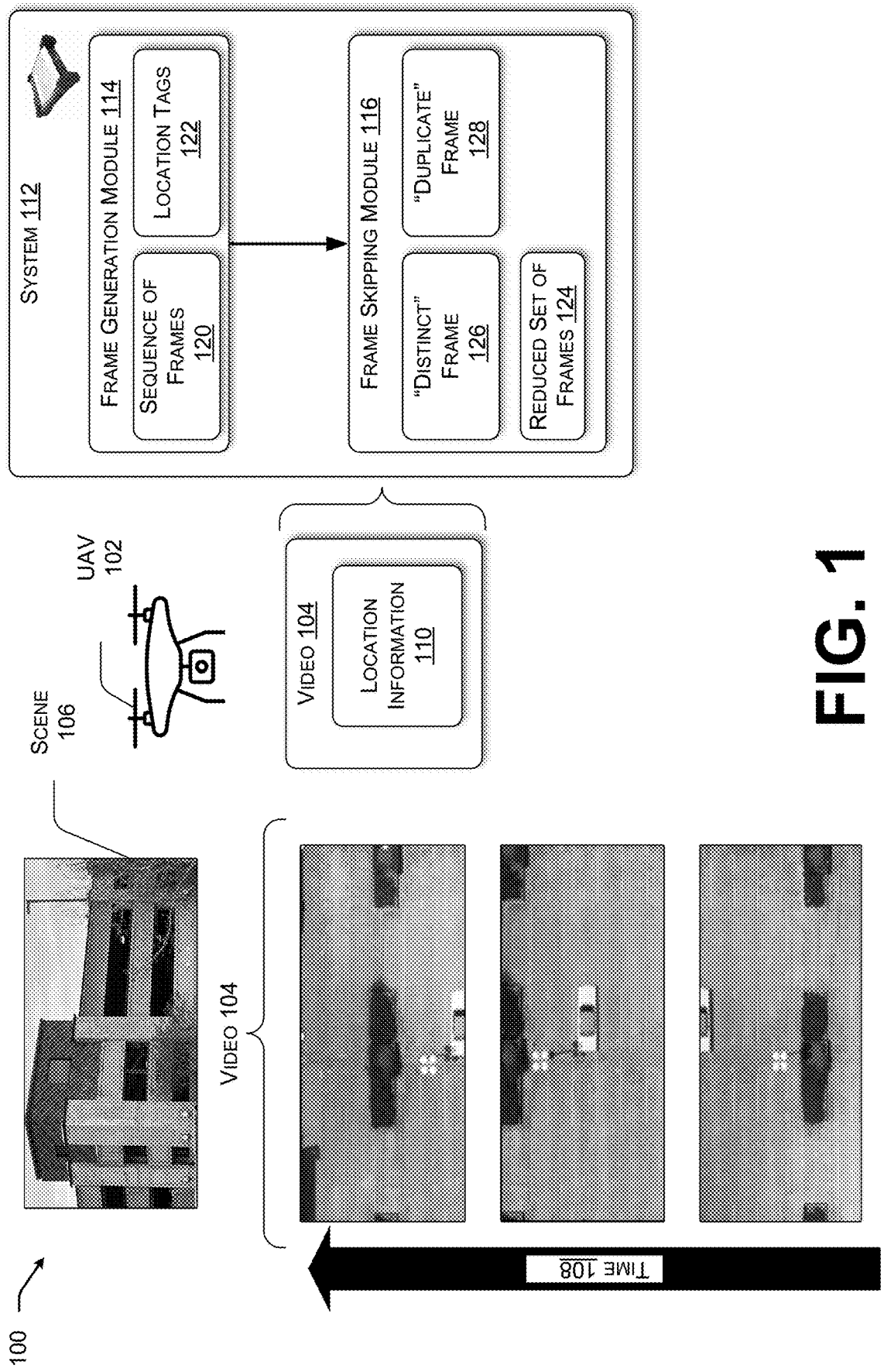
FIG. 1 illustrates an example environment in which a system can implement frame skipping to reduce a number of frames to be processed (e.g., stitched together to generate a map).

FIG. 1 illustrates an example environment 100 in which frame skipping can be implemented to reduce a number of frames to be processed (e.g., stitched together to generate a map). In the example of FIG. 1, the aerial vehicle is illustrated as a UAV 102 that is configured with a camera. The camera captures video 104 of a scene 106. In the example of FIG. 1, the scene 106 includes the top level of a parking garage. Accordingly, the UAV 102 is configured to surveil the top level of the parking garage by moving in various directions (e.g., north, south, east, west). As shown, the UAV 102 moves from south to north over a period of time 108, and thus, the video 104 includes frames showing the top level of the parking garage based on the movement.

The UAV 102 and/or the camera is configured with a mechanism to determine its geographical location as the UAV 102 moves. In one example, the mechanism is a Global Positioning System (GPS) and the geographical location is represented as coordinates such as a latitude position and a longitude position. Accordingly, the video 104 includes location information 110 that associates the geographical location of the UAV 102 and/or the camera with a time when a frame in the video 104 is captured.

Once the video 104 is captured by the camera on the UAV 102, the video 104 is provided to a system 112 along with the location information 110. The video 104 can be provided to the system 112 in real-time as the video 104 is captured (e.g., via a wireless network connection). Alternatively, the video 104 can be provided to the system 112 after the whole scene 106 has been surveilled and the UAV 102 has landed. In one example, the system 112 is an edge device that can easily be moved to different geographical areas along with the UAV 102 (e.g., AWS SNOWBALL EDGE device, an AZURE STACK EDGE MINI-R device, a HPE EDGELINE device). However, the system 112 can include other types of devices such as a computing device (e.g., a server) in the cloud.

The system 112 includes a frame generation module 114 and a frame skipping module 116, each of which is discussed herein. The number of illustrated modules in FIG. 1 is just an example, and the number can vary. That is, functionality described herein in association with the illustrated modules can be performed by a fewer number of modules or a larger number of modules on one device or spread across multiple devices.

The frame generation module 114 is configured to generate a sequence of frames 120 from the video 104 captured by the UAV 102 surveilling the scene 106. Moreover, the frame generation module 114 is configured to associate each frame in the sequence of frames 120 with a location tag 122. The frame generation module 114 extracts individual frames (i.e., still images) from the video 104 and associates each extracted frame with a location of the camera and/or the UAV 102 at a time 108 when the extracted frame is captured. In one example, the frame generation module 114 comprises SubRip Subtitle (SRT) software useable to generate a file in the SRT format.

The frame generation module 114 passes the sequence of frames 120 and the location tags 122 to the frame skipping module 116. The frame skipping module 116 is configured to evaluate (e.g., sequentially) the sequence of frames 120 in order to reduce the total number of frames for processing. Stated alternatively, the frame skipping module 116 generates a reduced set of frames 124. The number of frames in the reduced set of frames 124 is at least one frame and is smaller than the number of frames in the sequence of frames 120. To generate the reduced set of frames 124, the frame skipping module 116 evaluates a location tag 122 associated with a current frame in the sequence of frames 120 and determines if the location tag 122 associated with the current frame indicates a sufficient change in location of the camera and/or the UAV 102, such that the amount of overlapping content between the current frame and any previously evaluated frame that has already been added to the reduced set of frames 124 is less than an overlap threshold (e.g., twenty percent overlap). Whether there is a sufficient change in location is discussed below with respect to FIG. 2.

If the location tag 122 of the current frame indicates a sufficient change in location of the camera and/or the UAV 102, the frame skipping module 116 determines that the content captured in the current frame includes enough non-overlapping content to make the current frame distinct when compared to previous frames that have already been added to the reduced set of frames 124. Accordingly, the frame skipping module 116 designates the current frame as a "distinct" frame 126.

In contrast, if the location tag 122 of the current frame indicates an insufficient change in location of the camera and/or the UAV 102 such that the amount of overlapping content between the current frame and any previously evaluated frame that has already been added to the reduced set of frames 124 is greater than the overlap threshold, the frame skipping module 116 determines that the content of the current frame is duplicative of the content captured by a previously evaluated frame that has already been added to the reduced set of frames 124. Accordingly, the frame skipping module 116 designates the current frame as a "duplicate" frame 128.

Figure 2:
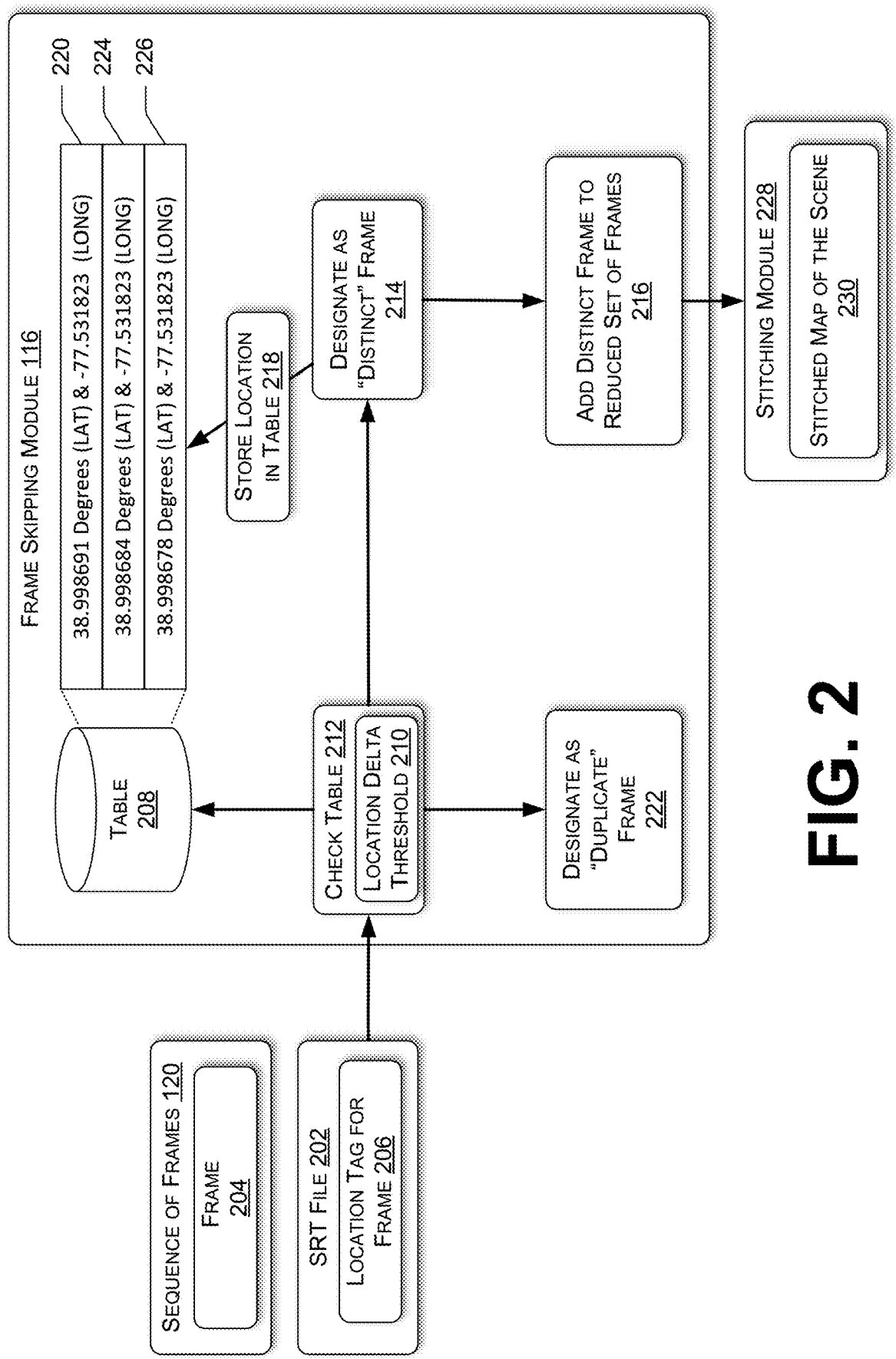
FIG. 2 illustrates an example of the frame location evaluation process useable to generate a reduced set of frames.

FIG. 2 further illustrates the example frame location evaluation process useable to generate the reduced set of frames 124. The frame location evaluation process is implemented by the frame skipping module 116. The frame skipping module 116 typically evaluates the frames in the sequence in which they are generated. Accordingly, FIG. 2 shows that the frame skipping module 116 receives the sequence of frames 120 along with a separate SRT file 202 that includes human-readable information for an individual frame 204 in the sequence of frames 120. The human-readable information includes a location tag 206 that indicates the location of the camera and/or the UAV 102 at the time the frame 204 is captured. Alternatively, an individual frame 204 can include metadata that indicates the location tag 206. Furthermore, the frame skipping module 116 is configured to store a table 208 that maintains locations associated with frames that have already been added to the reduced set of frames 124.

The frame skipping module 116 includes a location delta threshold 210. The location delta threshold 210, when satisfied, indicates that there is a sufficient amount of new content in a current frame being evaluated when compared to a previously evaluated frame (e.g., any previously evaluated frame, the last frame evaluated) that has already been added to the reduced set of frames 124 (e.g., the amount of overlapping content between the current frame and any previously evaluated frame is less than an overlap threshold, the amount of distinct content in the current frame is above a distinct content threshold when compared to any previously evaluated frame). The location delta threshold 210 is used to reduce the time and resources as the frame skipping module 116 does not need to perform image analysis to determine an amount of content overlap between frames.

As there are no previously evaluated frames at the time when the first frame in the sequence of frames 120 is evaluated by the frame skipping module 116, the frame skipping module 116 does not need to check 212 the table 208 to determine whether a location delta for the first frame satisfies the location delta threshold 210. Rather, the frame skipping module 116 can automatically designate 214 the first frame as a distinct frame and add 216 the first frame to the reduced set of frames. Furthermore, to ensure that subsequently evaluated frames do not include duplicative content, the frame skipping module 116 stores 218 the location of the distinct frame in the table 208. In this example, a record 220 representing the location of the first frame indicates a latitude position of "38.998691" degrees (North) and a longitude position of "−77.531823" (West).

The frame skipping module 116 then processes the next frame 204 in the sequence of frames 120. The next frame 204 is now the current frame being evaluated. The frame skipping module 116 checks 212 the table 208 to determine whether the location delta between the location associated with the current frame, as indicated via the location tag 206, and the location associated with a previously evaluated frame that has already been added to the reduced set of frames, as shown via the record 220 in the table 208, satisfies the location delta threshold 210. If the location delta does not satisfy the location delta threshold 210, the frame skipping module 116 designates 222 the current frame as a duplicate frame. Therefore, the frame skipping module 116 is able to discard the current frame to improve the efficiency with which the video can be processed.

In contrast, if the location delta satisfies the location delta threshold 210, the frame skipping module 116 determines that the content captured in the current frame is distinct (e.g., includes less than a threshold amount of overlap) and designates 214 the current frame as a distinct frame. The frame skipping module then adds 216 the distinct frame to the reduced set of frames and stores 218 the location of the distinct frame in the table 208.

In the example of FIG. 2, the location delta threshold 210 is "0.000005" degrees in either the latitude or the longitude direction. Accordingly, records 224 and 226 in the table 208 show frame locations of the UAV 102 that satisfy the location delta threshold. Stated alternatively, frames in the reduced set of frames are associated with the locations that are at least "0.000005" degrees apart from one another.

In one example, the location delta threshold 210 is determined by the frame skipping module 116 via the use of image analysis. The image analysis used to determine the location delta threshold 210 may be limited to an initial set of frames (e.g., the first five or ten frames) in the sequence of frames 120. Alternatively, the image analysis used to determine the location delta threshold 210 may be performed on a previous sequence of frames. Accordingly, the frame skipping module 116 can use the image analysis to determine that the change in content between a current frame being evaluated and a most recent frame that has been added to the reduced set of frames does not satisfy the overlap threshold. The frame skipping module 116 can then discard the current frame. If the frame skipping module 116 determines that the change in content between the current frame and the most recent frame added to the reduced set of frames satisfies the overlap threshold, the frame skipping module 116 adds the current frame to the reduced set of frames. Furthermore, the frame skipping module 116 determines the location delta threshold 210 based on the location of the camera and/or the UAV 102 when the current frame was captured and the location of the camera and/or the UAV 102 when the most recent frame added to the reduced set of frames was captured.

As shown in FIG. 2, in one example, the frame skipping module 116 serves the reduced set of frames 124 to a stitching module 228 for processing. The stitching module 228 produces an image mosaic of the reduced set of frames 124, thus creating a stitched map of the scene 230. That is, the stitching module 228 takes the reduced set of frames 124 and uses key points and/or object recognition to implement an image-stitching process that places the frames in the reduced set of frames 124 to produce a detailed stitched map of the scene 230. In one example, the stitching algorithm used by the stitching module 228 to generate the stitched map of the scene 130 is NodeODM. Other examples of stitching algorithms include AGISOFT Photoscan, PIX4D, and AUTOPANO. The stitching algorithm typically defines the overlap threshold needed to accurately stitch together a map of a scene. Consequently, the overlap threshold can vary based on a stitching algorithm that is being used. For instance, one stitching algorithm may require at least twenty percent overlap while another stitching algorithm may require thirty percent overlap.

To illustrate the improvement provided by the frame skipping module 116, a UAV 102 surveilled a scene 106 for fifteen minutes at an altitude of about one hundred feet while moving at a speed of about fifteen miles per hour. The UAV was configured with a camera that captures four frames per second, producing a video 104 with roughly three thousand and six hundred frames. Using the techniques described herein, the frame skipping module 116 reduced the three thousand and six hundred frames to thirty-three frames without compromising the quality with which a stitched map 230 was generated. This reduced the initial number of frames to process by over ninety-nine percent (99%).

Figure 3:
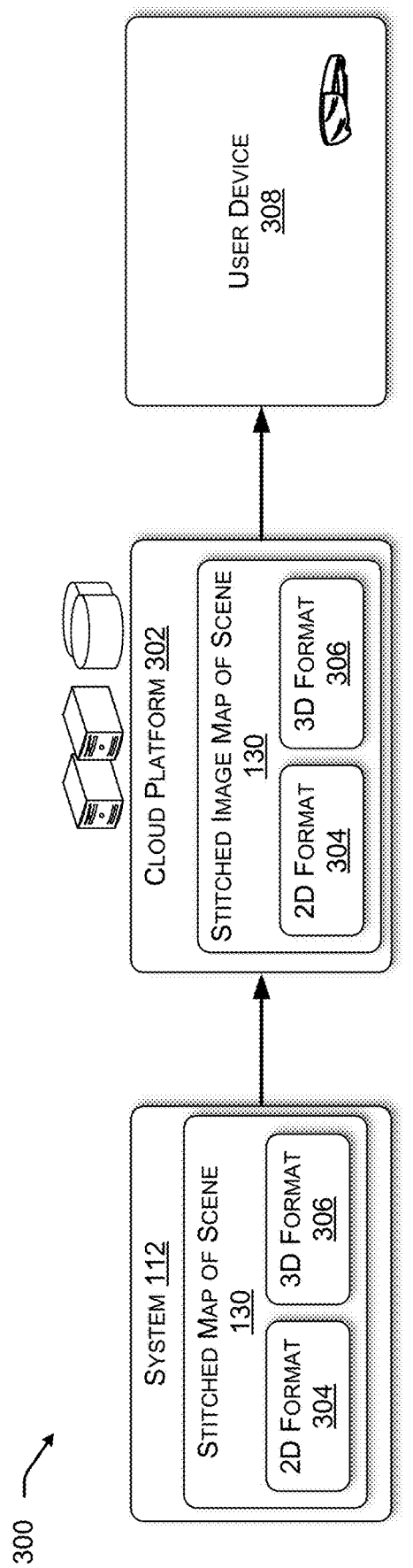
FIG. 3 illustrates an example environment in which a stitched map of a scene can be uploaded from the system to a cloud platform and/or downloaded from the cloud platform to different users and devices.

FIG. 3 illustrates an example environment 300 in which the stitched map of the scene 130 can be uploaded from the system 112 to a cloud platform 302, where it is made available for download to different users and devices. In this example environment, the system 112 is an edge device (e.g., AWS SNOWBALL EDGE device, an AZURE STACK EDGE MINI-R device, an HPE EDGELINE device) that can easily be moved to different geographical areas along with an aerial vehicle (e.g., the UAV 102), such that it can execute in disconnected environments. The system 112 may be configured to generate the reduced set of frames 124 and the stitched map of the scene 230 offline in a short period of time (e.g., eight to ten minutes after the UAV 102 has landed). Alternatively, the system 112 may upload the reduced set of frames 124 and the cloud platform 302 can generate the stitched map of the scene 230. In other embodiments, the system 112 is a cloud platform, such that the system 112 and the cloud platform 302 are effectively the same entity. In such embodiments, the cloud platform 302 receives the sequence of frames from the video and processes it as discussed above. Furthermore, the system 112 and/or the cloud platform 302 can generate the stitched map of the scene 230 in different formats such as a two-dimensional (2D) format 304 or a three-dimensional (3D) format 306.

In some embodiments, upon establishing a network connection to the cloud platform 302, the system 112 uploads the reduced set of frames 124 and/or the stitched map of the scene 230 in the 2D format 304 and/or the 3D format 306. The cloud platform 302 enables various user devices 308 to download the stitched map of the scene 230 so that a user can interact with the stitched map of the scene 230. For instance, a user device 308 can include a head-mounted display device that enables user interaction with the 3D format 306 of the stitched map of the scene 230.

As mentioned above, one scenario in which the techniques described herein can be used is when a geographical area needs to be urgently inspected to identify problems. For instance, a public safety reason may require the immediate manual inspection of the geographical area (e.g., to identify damages to building structures, to determine where people in need of help are located, to identify the current location and available navigation routes of a public threat such as an active shooter or a wild animal). Accordingly, via the use of the UAV 102, the frame generation module 114, the frame skipping module 116, and the stitching module 228, the stitched map of the scene 230 can be made available to a remote user device 308 in a matter of minutes. Accordingly, an inspector can view and interact with the stitched map of the scene 230 (e.g., zoom in, zoom out) to quickly identify concerns or problems.

In various examples, the cloud platform 302 can perform additional image analysis on the stitched map of the scene 130 to enhance the user experience. For example, the cloud platform 302 can implement object detection techniques to mark points of interest on the stitched map of the scene 230. In one example, a point of interest may be an object that is part of a predetermined problem or concern (e.g., an active shooter, an animal, a vehicle, a landmark, a person in need of assistance such as a missing hiker or someone to be rescued from flooding waters).

Figure 4:
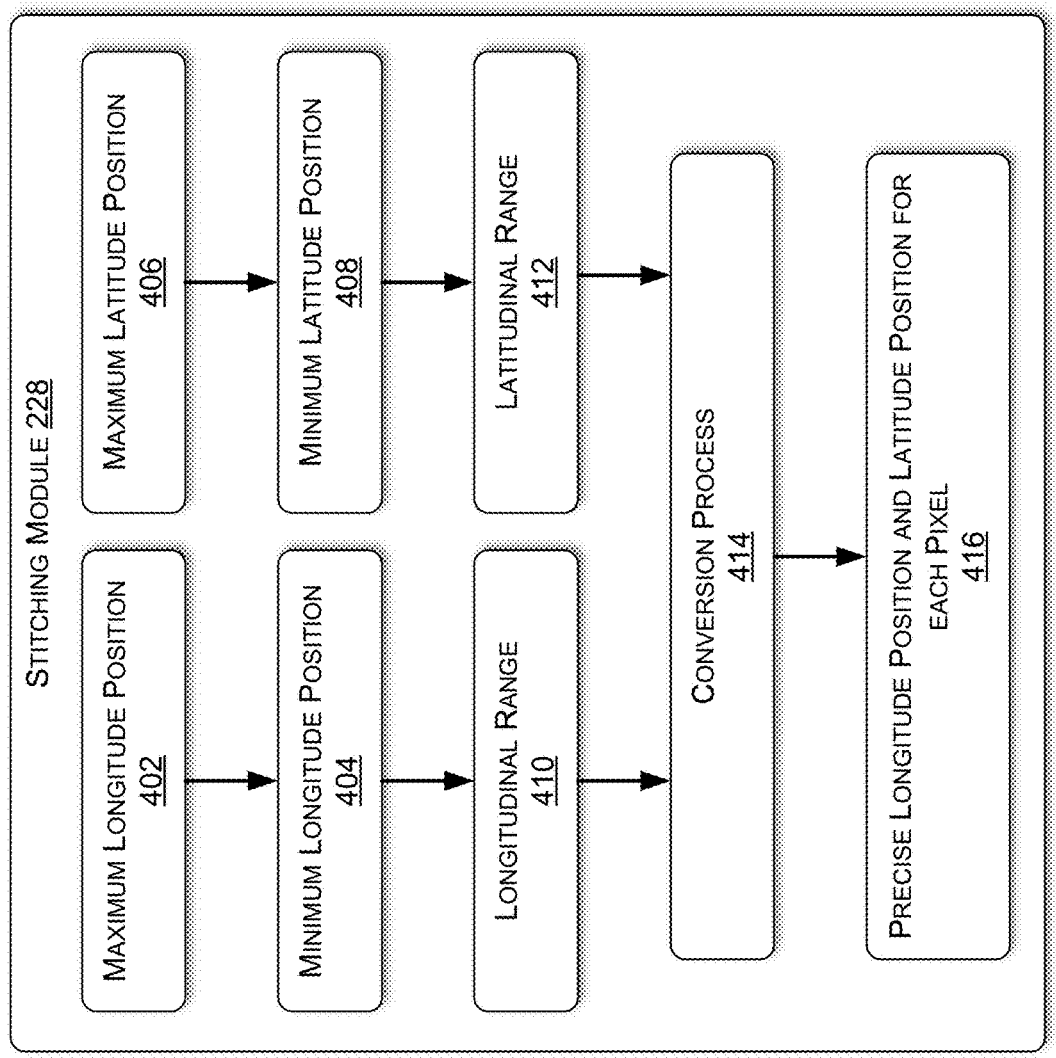
FIG. 4 illustrates an example location conversion process that assigns a precise location to a pixel in the stitched map of the scene.

FIG. 4 illustrates an example location conversion process that assigns a precise location to a pixel in the stitched map of the scene 230. The stitching module 228 is configured to use the locations associated with the reduced set of frames 124 to determine a range of longitudinal coordinates associated with the surveilled scene and a range of latitudinal coordinates associated with the surveilled scene. Stated alternatively, the stitching module 228 determines a maximum longitude position 402 and minimum longitude position 404 from the locations, as well as a maximum latitude position 406 and minimum latitude position 408 from the locations.

The stitching module 228 uses the maximum longitude position 402 and the minimum longitude position 404 into a longitudinal range 410. Moreover, the stitching module 118 uses the maximum latitude position 406 and the minimum latitude position 408 into a latitudinal range 412. Once the ranges 410 and 412 are determined, the stitching module 228 can use a conversion process 414 to assign a precise longitude position and latitude position to each pixel 416 in the stitched map of the scene 230. For instance, the stitching module 228 knows a height and a width (e.g., in number of pixels) in the stitched map of the scene 230. The conversion process 414 can divide the longitudinal range 410 by the number of pixels that comprises the width to determine a difference in longitude between each pixel. Moreover, the conversion process 414 can divide the latitudinal range 412 by the number of pixels that comprises the height to determine a difference in latitude between each pixel. The differences in longitude and latitude can be used to assign the precise longitude position and latitude position to each pixel 416.

Figure 5:
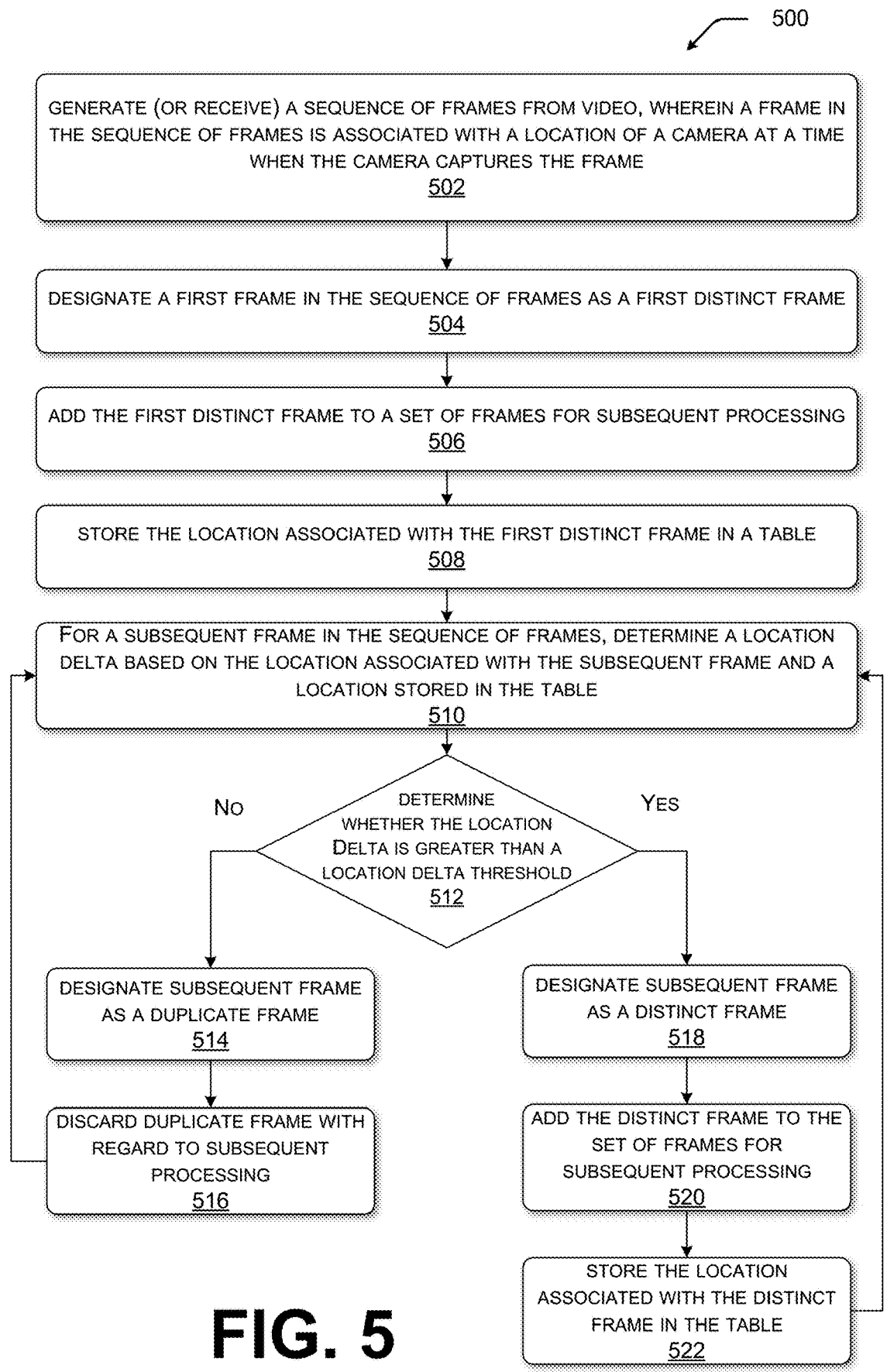
FIG. 5 is an example flow diagram showing aspects of a method implemented to reduce a number of frames to be processed (e.g., stitched together to generate a map).

Turning now to FIG. 5, aspects of a method 500 implemented to reduce a number of frames to be processed (e.g., stitched together to generate a map) are shown and described. The method 500 beings at operation 502 where a sequence of frames is generated from video captured by a camera surveilling a scene. Alternatively, the sequence of frames can be received from an external entity. A frame in the sequence of frames is associated with a location of the camera at a time when the camera captures the frame.

At operation 504, a first frame in the sequence of frames is designated as a first distinct frame. At operation 506, the first distinct frame is added to a set of frames for subsequent processing. At operation 508, the location associated with the first distinct frame is stored in a table.

At operation 510, a location delta is determined for a subsequent frame in the sequence of frames based on the location associated with the subsequent frame and a location stored in the table. Then at operation 512, it is determined whether the location delta is greater than a location delta threshold. If it is determined via operation 512 that the location delta is not greater than the location delta threshold (i.e., "No"), the process proceeds to operation 514 where the subsequent frame is designated as a duplicate frame. Operation 516 captures how the duplicate frames can be discarded with regard to subsequent processing (e.g., not included in the subsequent processing).

Alternatively, if it is determined via operation 512 that the location delta is greater than the location delta threshold (i.e., "Yes"), the process proceeds to operation 518 where the subsequent frame is designated as a distinct frame. Then at operation 520, the distinct frame is added to the set of frames for subsequent processing. Moreover, at operation 522, the location associated with the distinct frame is stored in the table. As shown by the arrows from operations 516 and 522 back to operation 510, the locations for each subsequent frame is evaluated until all the frames in the sequence of frames have been evaluated.

Using the different designations allows the system to reduce a number of frames that are passed on for processing. That is, a number of frames in the set of frames is less than a number of frames in the sequence of frames.

For ease of understanding, the process discussed in this disclosure is delineated as separate operations represented as independent blocks. However, these separately delineated operations should not be construed as necessarily order dependent on their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 6:
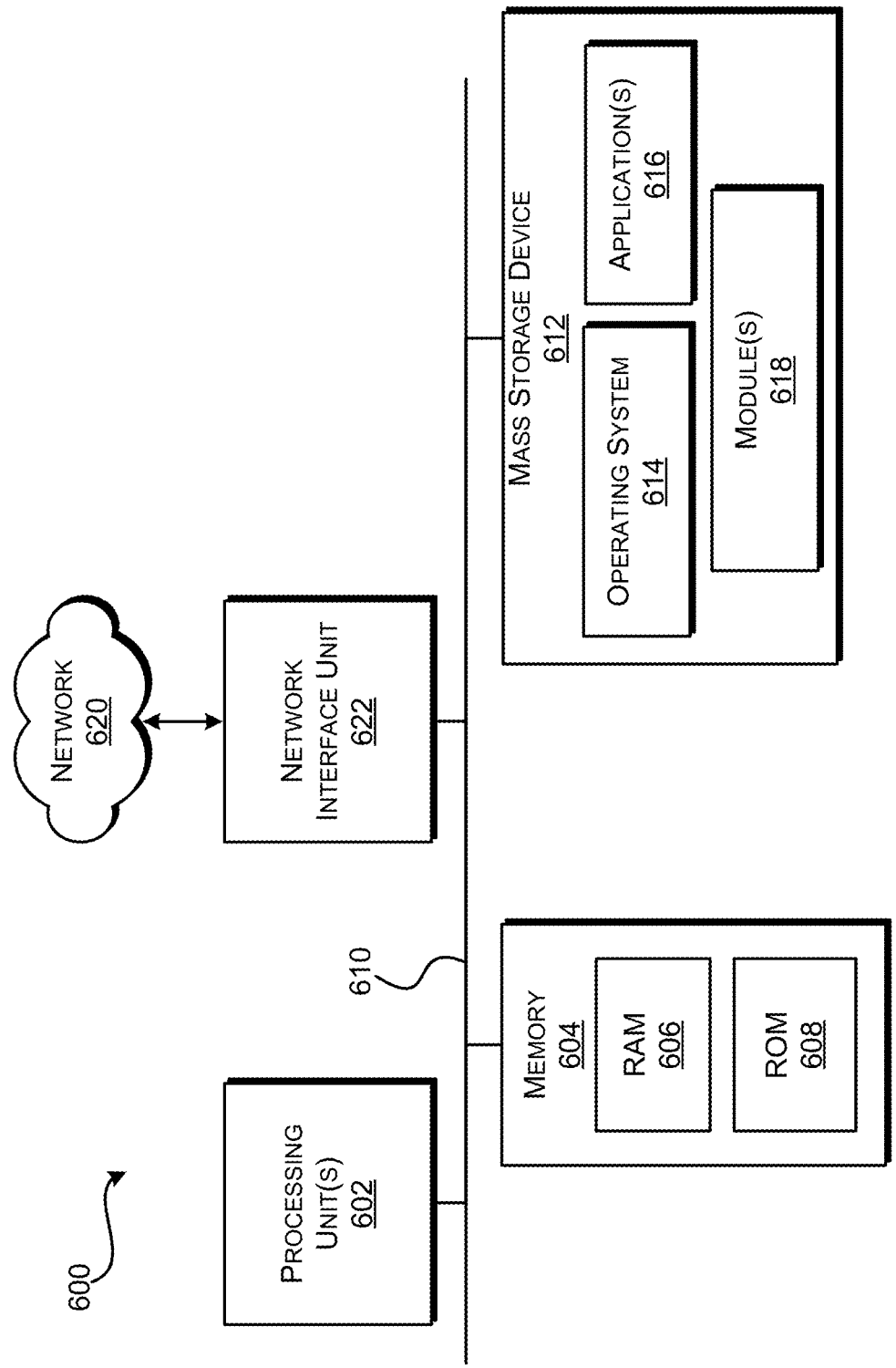
FIG. 6 is a computer architecture diagram showing an illustrative computer hardware and software architecture for a computing system capable of implementing aspects of the techniques and technologies presented herein.

FIG. 6 shows additional details of an example computer architecture 600 for a device, such as a computer or a server capable of executing computer instructions (e.g., a module described herein). The computer architecture 600 illustrated in FIG. 6 includes processing system including processing unit(s) 602, a system memory 604, including a random-access memory 606 (RAM) and a read-only memory (ROM) 608, and a system bus 610 that couples the memory 604 to the processing unit(s) 602. In various examples, the processing units 602 of the processing system are distributed. Stated another way, one processing unit 602 of the processing system may be located in a first location (e.g., a rack within a datacenter) while another processing unit 602 of the processing system is located in a second location separate from the first location.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

The disclosure presented herein also encompasses the subject matter set forth in the following clauses.

Example Clause A, a system comprising: a processing system; and computer-readable storage media storing instructions that, when executed by the processing system, cause the system to perform operations comprising: receiving a sequence of frames from video captured by a camera surveilling a scene, wherein a respective frame in the sequence of frames is associated with a respective location of the camera at a time when the camera captures the respective frame; designating a first frame in the sequence of frames as a first distinct frame; adding the first distinct frame to a set of frames for subsequent processing; storing a first location associated with the first distinct frame in a table; determining a first location delta for a second frame in the sequence of frames based on a second location associated with the second frame and another location stored in the table; determining that the first location delta is not greater than a location delta threshold; in response to determining that the first location delta is not greater than the location delta threshold, designating the second frame as a duplicate frame; determining a second location delta for a third frame in the sequence of frames based on a third location associated with the third frame and another location stored in the table; determining that the second location delta is greater than the location delta threshold; in response to determining that the second location delta is greater than the location delta threshold: designating the third frame as a subsequent distinct frame; adding the subsequent distinct frame to the set of frames for subsequent processing, wherein a number of frames in the set of frames is less than a number of frames in the sequence of frames; and storing the third location associated with the subsequent distinct frame in the table.

Example Clause B, the system of Example Clause A, wherein the operations further comprise generating a stitched map for the scene using the set of frames.

Example Clause C, the system of Example Clause B, wherein the stitched map for the scene is generated in a two-dimensional format.

Example Clause D, the system of Example Clause B, wherein the stitched map for the scene is generated in a three-dimensional format.

Example Clause E, the system of any one of Example Clauses B through D, wherein the respective location associated with the respective frame comprises global positioning system (GPS) coordinates.

Example Clause F, the system of Example Clause E, wherein the operations further comprise: determining a first range of longitudinal positions associated with the scene; determining a second range of latitudinal positions associated with the scene; using the first range and the second range to determine a longitudinal position and a latitudinal position for an individual pixel in the stitched map; and associating the longitudinal position and the latitudinal position with the individual pixel in the stitched map.

Example Clause G, the system of any one of Example Clauses A through F, wherein the operations further comprise determining the location delta threshold based on two locations associated with two frames determined to have less than a threshold amount of content overlap via image analysis.

Example Clause H, the system of any one of Example Clauses A through G, wherein the camera is associated with an unmanned aerial vehicle (UAV).

Example Clause I, a system comprising: a processing system; and computer-readable storage media storing instructions that, when executed by the processing system, cause the system to perform operations comprising: generating a sequence of frames from video captured by a camera surveilling a scene, wherein a respective frame in the sequence of frames is associated with a respective location of the camera at a time when the camera captures the respective frame; designating a first frame in the sequence of frames as a first distinct frame; adding the first distinct frame to a set of frames; storing the first location associated with the first distinct frame in a table; for a subsequent frame in the sequence of frames: determining a location delta based on a particular location associated with the subsequent frame and another location stored in the table; determining that the location delta is greater than a location delta threshold; in response to determining that the location delta is greater than the location delta threshold: designating the subsequent frame as a subsequent distinct frame; adding the subsequent distinct frame to the set of frames, wherein a number of frames in the set of frames is less than a number of frames in the sequence of frames; and storing the particular location associated with the subsequent distinct frame in the table.

Example Clause J, the system of Example Clause I, wherein the operations further comprise generating a stitched map for the scene using the set of frames.

Example Clause K, the system of Example Clause J, wherein the stitched map for the scene is generated in a two-dimensional format.

Example Clause L, the system of Example Clause J, wherein the stitched map for the scene is generated in a three-dimensional format.

Example Clause M, the system of any one of Example Clauses J through L, wherein the respective location associated with the respective frame comprises global positioning system (GPS) coordinates.

Example Clause N, the system of Example Clause M, wherein the operations further comprise: determining a first range of longitudinal positions associated with the scene; determining a second range of latitudinal positions associated with the scene; using the first range and the second range to determine a longitudinal position and a latitudinal position for an individual pixel in the stitched map; and associating the longitudinal position and the latitudinal position with the individual pixel in the stitched map.

Example Clause O, the system of any one of Example Clauses I through N, wherein the operations further comprise determining the location delta threshold based on two locations associated with two frames determined to have less than a threshold amount of content overlap via image analysis.

Example Clause P, a method comprising: receiving a sequence of frames from video of a scene captured by a camera, wherein a respective frame in the sequence of frames is associated with a respective location of the camera at a time when the camera captures the respective frame; designating a first frame in the sequence of frames as a first distinct frame; adding the first distinct frame to a set of frames for subsequent processing; storing the location associated with the first distinct frame in a table; for a subsequent frame in the sequence of frames: determining a location delta based on a particular location associated with the subsequent frame and another location stored in the table; determining that the location delta is greater than a location delta threshold; in response to determining that the location delta is greater than the location delta threshold: designating the subsequent frame as a subsequent distinct frame; adding the subsequent distinct frame to the set of frames for subsequent processing, wherein a number of frames in the set of frames is less than a number of frames in the sequence of frames; and storing the particular location associated with the subsequent distinct frame in the table.

Example Clause Q, the method of Example Clause P, wherein the operations further comprise generating a stitched map for the scene using the set of frames.

Example Clause R, the method of Example Clause Q, wherein the respective location associated with the respective frame comprises global positioning system (GPS) coordinates.

Example Clause S, the method of Example Clause R, further comprising: determining a first range of longitudinal positions associated with the scene; determining a second range of latitudinal positions associated with the scene; using the first range and the second range to determine a longitudinal position and a latitudinal position for an individual pixel in the stitched map; and associating the longitudinal position and the latitudinal position with the individual pixel in the stitched map.

Example Clause T, the method of any one of Example Clauses P through S, further comprising determining the location delta threshold based on two locations associated with two frames determined to have less than a threshold amount of content overlap via image analysis.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different frames)

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
a processing system; and
computer-readable storage media storing instructions that, when executed by the processing system, cause the system to perform operations comprising:
receiving a sequence of frames from video captured by a camera surveilling a scene, wherein a respective frame in the sequence of frames is associated with a respective location of the camera at a time when the camera captures the respective frame;
designating a first frame in the sequence of frames as a first distinct frame;
adding the first distinct frame to a set of frames for subsequent processing;
storing a location associated with the first frame in a table;
for each of one or more initial frames following the first frame in the sequence of frames, performing image analysis to identify a second frame for which the first frame and the second frame have less than a threshold amount of content overlap;
learning a location delta threshold based on the location associated with the first frame and a location associated with the second frame;
designating the second frame as a second distinct frame;
adding the second distinct frame to the set of frames for subsequent processing;
storing the location associated with the second frame in the table;
determining a first location delta for a subsequent frame in the sequence of frames based on a location associated with the subsequent frame and the locations stored in the table;
determining that the first location delta is not greater than the location delta threshold;
in response to determining that the first location delta is not greater than the location delta threshold, designating the subsequent frame as a duplicate frame;
determining a second location delta for another subsequent frame in the sequence of frames based on a location associated with the other subsequent frame and the locations stored in the table;
determining that the second location delta is greater than the location delta threshold;
in response to determining that the second location delta is greater than the location delta threshold:
designating the other subsequent frame as a third distinct frame;

adding the third distinct frame to the set of frames for subsequent processing, wherein a number of frames in the set of frames is less than a number of frames in the sequence of frames; and storing the location associated with the other subsequent frame in the table.

2. The system of claim 1, wherein the operations further comprise generating a stitched map for the scene using the set of frames.

3. The system of claim 2, wherein the stitched map for the scene is generated in a two-dimensional format.

4. The system of claim 2, wherein the stitched map for the scene is generated in a three-dimensional format.

5. The system of claim 2, wherein the respective location associated with the respective frame comprises global positioning system (GPS) coordinates.

6. The system of claim 5, wherein the operations further comprise:
   determining a first range of longitudinal positions associated with the scene;
   determining a second range of latitudinal positions associated with the scene;
   using the first range and the second range to determine a longitudinal position and a latitudinal position for an individual pixel in the stitched map; and
   associating the longitudinal position and the latitudinal position with the individual pixel in the stitched map.

7. The system of 2, wherein the threshold amount of content overlap is determined by a stitching algorithm used to generate the stitched map.

8. The system of claim 1, wherein the camera is associated with an unmanned aerial vehicle (UAV).

9. A system comprising:
   a processing system; and
   computer-readable storage media storing instructions that, when executed by the processing system, cause the system to perform operations comprising:
      generating a sequence of frames from video captured by a camera surveilling a scene, wherein a respective frame in the sequence of frames is associated with a respective location of the camera at a time when the camera captures the respective frame;
      designating a first frame in the sequence of frames as a first distinct frame;
      adding the first distinct frame to a set of frames;
      storing a location associated with the first frame in a table;
      for each of one or more initial frames following the first frame in the sequence of frames, performing image analysis to identify a second frame for which the first frame and the second frame have less than a threshold amount of content overlap;
      learning a location delta threshold based on the location associated with the first frame and a location associated with the second frame;
      designating the second frame as a second distinct frame;
      adding the second distinct frame to the set of frames for subsequent processing;
      storing the location associated with the second frame in the table;
      for a subsequent frame in the sequence of frames:
         determining a location delta based on a location associated with the subsequent frame and the locations stored in the table;
         determining that the location delta is greater than the location delta threshold;
         in response to determining that the location delta is greater than the location delta threshold:
            designating the subsequent frame as a subsequent distinct frame;
            adding the subsequent distinct frame to the set of frames, wherein a number of frames in the set of frames is less than a number of frames in the sequence of frames; and
            storing the location associated with the subsequent frame in the table.

10. The system of claim 9, wherein the operations further comprise generating a stitched map for the scene using the set of frames.

11. The system of claim 10, wherein the stitched map for the scene is generated in a two-dimensional format.

12. The system of claim 10, wherein the stitched map for the scene is generated in a three-dimensional format.

13. The system of claim 10, wherein the respective location associated with the respective frame comprises global positioning system (GPS) coordinates.

14. The system of claim 13, wherein the operations further comprise:
   determining a first range of longitudinal positions associated with the scene;
   determining a second range of latitudinal positions associated with the scene;
   using the first range and the second range to determine a longitudinal position and a latitudinal position for an individual pixel in the stitched map; and
   associating the longitudinal position and the latitudinal position with the individual pixel in the stitched map.

15. The system of claim 10, wherein the threshold amount of content overlap is determined by a stitching algorithm used to generate the stitched map.

16. A method comprising:
   receiving a sequence of frames from video of a scene captured by a camera, wherein a respective frame in the sequence of frames is associated with a respective location of the camera at a time when the camera captures the respective frame;
   designating a first frame in the sequence of frames as a first distinct frame;
   adding the first distinct frame to a set of frames for subsequent processing;
   storing a location associated with the first frame in a table;
   for each of one or more initial frames following the first frame in the sequence of frames, performing image analysis to identify a second frame for which the first frame and the second frame have less than a threshold amount of content overlap;
   learning a location delta threshold based on the location associated with the first frame and a location associated with the second frame;
   designating the second frame as a second distinct frame;
   adding the second distinct frame to the set of frames for subsequent processing;
   storing the location associated with the second frame in the table;
   for a subsequent frame in the sequence of frames:
      determining a location delta based on a location associated with the subsequent frame and the locations stored in the table;
      determining that the location delta is greater than the location delta threshold;
      in response to determining that the location delta is greater than the location delta threshold:

designating the subsequent frame as a subsequent distinct frame;

adding the subsequent distinct frame to the set of frames for subsequent processing, wherein a number of frames in the set of frames is less than a number of frames in the sequence of frames; and storing the location associated with the subsequent frame in the table.

17. The method of claim 16, wherein the operations further comprise generating a stitched map for the scene using the set of frames.

18. The method of claim 17, wherein the respective location associated with the respective frame comprises global positioning system (GPS) coordinates.

19. The method of claim 18, further comprising:

determining a first range of longitudinal positions associated with the scene;

determining a second range of latitudinal positions associated with the scene;

using the first range and the second range to determine a longitudinal position and a latitudinal position for an individual pixel in the stitched map; and associating the longitudinal position and the latitudinal position with the individual pixel in the stitched map.

20. The method of claim 17, further comprising determining the threshold amount of content overlap via a stitching algorithm used to generate the stitched map.

* * * * *